June 4, 1968 G. E. BISHOP ET AL 3,386,535

FRICTION BAND

Filed Oct. 26, 1966

INVENTORS
Gary E. Bishop &
Winlaw B. Bramley, Jr.

Charles C. White
ATTORNEY

United States Patent Office 3,386,535
Patented June 4, 1968

3,386,535
FRICTION BAND
Gary E. Bishop, Warren, and Winlaw B. Bramley, Jr., Milford, Mich., assignors to General Motors Corporation, Detroit, Mich., a corporation of Delaware
Filed Oct. 26, 1966, Ser. No. 589,713
14 Claims. (Cl. 188—77)

ABSTRACT OF THE DISCLOSURE

A multi-wrap friction band in which the band legs are tapered so that they contact or are close to each other in a band-released position enabling them to mutually dampen leg vibrations and reduce rattle. When the band is moved to an apply position, the taper of the legs provides for increased clearance therebetween to insure full band apply to a friction surface.

---

This invention relates to friction bands for retarding the rotation of a member and more particularly to a multi-wrap friction band having a plurality of legs which extend from a central bridge portion. The legs are formed so that they interfit when the band is rolled into a hoop and have minimum clearance therebetween when in a free or set position to reduce vibration and noise. When the band is actuated and moved toward an apply position to retard rotation of the member there is increasing clearance between the legs allowing maximum braking effort to be applied to the member.

Multi-wrap friction bands have been successfully used for retarding rotation of reaction elements in automatic transmissions. However, these bands are sometimes subject to a rattling condition when the band is in a neutral or non-apply condition and when the environmental temperature is low, such as 40° F. This rattling noise is caused by the reaction drum picking up cold oil and dragging it between the face of the drum and the friction surface of the band. The band influenced by this oil tends to move toward the apply position but because it is anchored will snap back to its full release position. This tendency to move between the apply and release position in rapid succession under these conditions causes the objectionable rattling condition. As soon as the transmission is placed in a drive range, in which the band is in contact with the drum, the drum will stop turning and the band, being applied will not rattle.

This invention concerns an improved band design which has minimum clearance between the legs of the band when in a released, set position such as in park or neutral. In accordance with this invention there is a hooped, multi-wrap band having spaced legs with interior edges tapered from a central bridge portion to form at least one tapered slot therebetween. Extending in an opposite direction from the bridge portion is at least one leg having edges which taper to form a part that conforms with this tapered slot.

In one embodiment of the invention the spaced legs provide a tapering slot with decreasing width from the bridge to provide a close fit between the single leg and the facing sides of the tapered leg portion when the band is in its set position. When this band is contracted to provide for retardation of rotation, there will be increasing clearance between the leg members. When the band is relaxed and is in its set position the leg members will be closely adjacent to or in contact with each other to minimize rattle and other noises due to band vibration.

In the second embodiment of the invention the band has legs which taper from a central bridge portion in a manner so that there is increasing clearance between the legs when the band is expanded to retard rotation of a member. When the band is in its set, contracted position, the clearance reduces so that rattle will be reduced.

One object of this invention is to provide a multi-wrap friction band for retardation of rotation of a movable element in which there is variable clearance between the leg portions of the band.

Another object of this invention is to provide a friction band having minimum clearance between leg portions when the band is in a relaxed position to reduce band rattle and maximum clearance when the band is applied to retard rotation of a movable element.

Another object of this invention is to provide a multi-wrap friction band which is contractable to frictionally engage a rotating member to retard rotation thereof, which band has increasing clearance upon apply thereof to the rotating element and decreasing clearance when released to minimize brake band vibration and noise.

A further feature and object of this invention is to provide a normally contracted band in which side clearance between the legs thereof is at a minimum when contracted and expandable into engagement with a rotatable element to retard rotation thereof, the band legs having maximum clearance when in the applied position.

These and other objects of this invention will become more apparent from the following detailed description and drawings in which.

Figure 3:
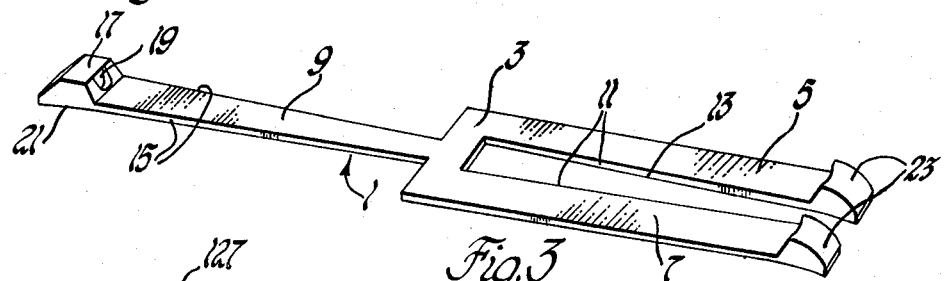
FIGURE 3 is a perspective view of the band utilized in FIGURES 1 and 2.

Turning now to the drawings, there is shown in FIGURE 3 a double-wrap band 1 which has been blanked or otherwise formed from flexible metallic strip stock. This band has a center bridge portion 3 and similar spaced legs 5 and 7 which extend therefrom in one direction and a central leg 9 which extends from the bridge portion in an opposite direction. Legs 5 and 7 have outer edges which are parallel with each other and perpendicular to the bridge portion but have inner edges 11 which taper inwardly so that the legs 5 and 7 become increasingly larger as they extend away from the bridge portion. These legs define an outwardly narrowing tapered slot 13 which conforms with the leg 9 having edges 15 which taper outwardly from the bridge portion. As shown, the width of leg 9 increases as it extends outwardly therefrom.

After the band is blanked, the leg 9 is provided with a lug 17 recessed at 19 which is preferably formed by upsetting the end thereof. The leg is then slightly bent inwardly as at 21. Also, each of the legs 5 and 7 are similarly provided with lugs 23 by upsetting the leg ends and are also bent slightly inwardly as illustrated. The sides of the lugs are then machined to remove any rough edges. The band is then rough formed by rolling it into a hoop by the use of suitable rolling or forming equipment. When properly rolled, the leg 9 fits between legs 5 and 7.

After this rough forming the band is sized by a conventional stretching fixture, not illustrated, which expands the band beyond its elastic limit so as to effect a set in the band and give it a predetermined size and shape. When removed from the fixture, the band will be generally cylindrical with the edges 15 of the leg 9 contacting or closely adjacent to the interior edges 11 of the legs 5 and 7. Also there is clearance 25 between the end of the leg 9 and one end of bridge 3 and clearance 29 between the ends of legs 5 and 7 and the other end of the bridge. These clearances provide travel distance to allow the band to be contracted as will be pointed out below.

After the sizing of the band, a suitable friction liner 31 is attached to the interior surface thereof. This liner may be formed by a plurality of curved parts shaped to conform with the profile of the tapered legs or may be formed from a single cylindrical part having legs which are like the legs of the band. Subsequent to the apply of the lining to the band, the friction band can then be installed in an environment such as that illustrated in FIGURE 1.

As shown in this figure, there is a drum 33 which has an exterior annular friction surface 35 which is engageable by the friction liner of the band upon the contraction thereof. The drum may be suitably secured to a control gear of a power transmitting planetary gear set, not illustrated. When installed, the friction band is grounded to a transmission case 37 by the use of projections or stud pins 39 which fit into recesses provided in the lugs 23 as shown best in FIGURE 1. The lug 17 provided on the end of leg 9 is adjustably connected by a threaded link 41 to a nut 45 secured to a hydraulically actuated apply piston 47 suitably mounted in the case.

Figure 1:
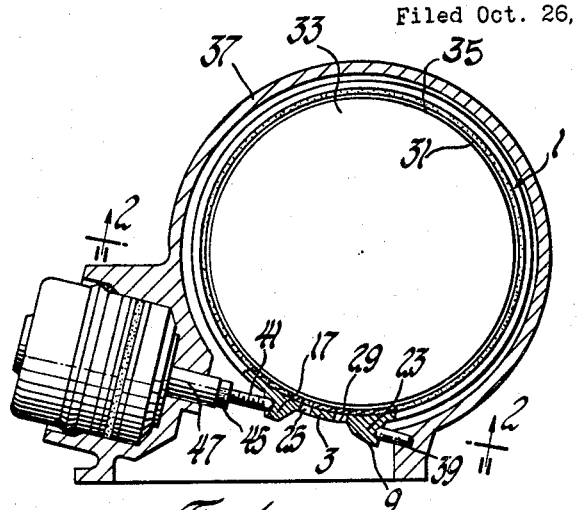
FIGURE 1 is a sectional view of a portion of an automatic transmission.
Figure 2:
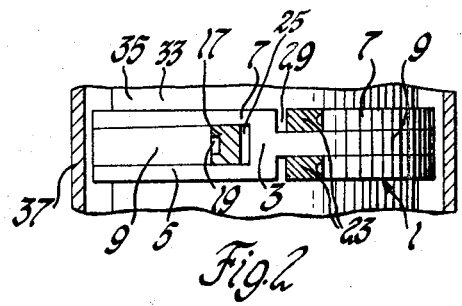
FIGURE 2 is a view partly in section generally taken along line 2—2 of FIGURE 1.

When the piston 47 is retracted, the band will be in its expanded or released position as shown in FIGURES 1 and 2 with the liner 31 spaced from the drum. In this position the outer edges 15 of the central leg 9 are in contact with or closely adjacent to the inner edges of the legs 5 and 7. Since there is, at most, only a small clearance between the legs when the band is in a released position, the legs can cooperate to dampen leg vibrations. This could occur when cold oil tends to move the band toward an apply position and the band springs back to the rebiased position as pointed out above.

The band is contracted toward a true circle by energizing the piston 47. Apply movement of the piston moves the linkage 41 and the lug 17 toward the bridge to take up part of the travel space, thereby contracting the band. When contracted, the friction face of the band will engage the outer surface of the drum and retard rotation thereof and condition the planetary gear unit for a ratio change. As the band is contracted, it will be appreciated that the clearance between the legs will increase as the end 27 of leg 9 moves toward the respective end of the bridge. After the drum is retarded from rotation, the piston may again be retracted and the friction band will spring back to the set position of FIGURE 2. The drum will then be released.

Figure 4:
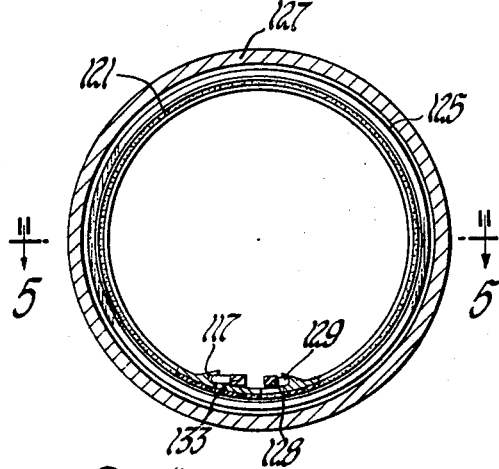
FIGURE 4 is a view similar to FIGURE 1 but illustrating another embodiment of the invention.
Figure 5:
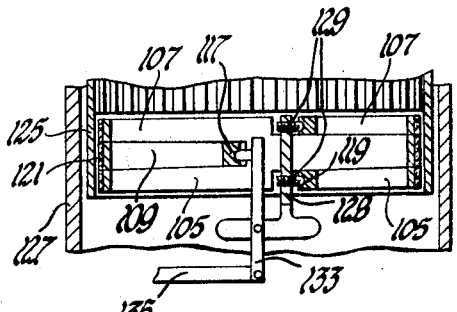
FIGURE 5 is a view taken generally along the line 5—5 of FIGURE 4.
Figure 6:
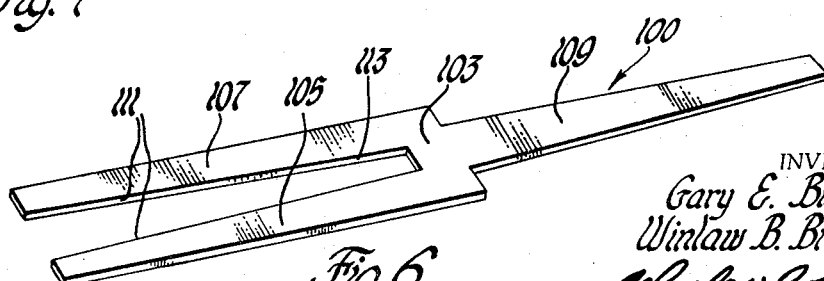
FIGURE 6 is a perspective view of a blanked double-wrap band for use in the embodiment of FIGURES 4 and 5.

The second embodiment of the invention is illustrated in FIGURES 4, 5 and 6. FIGURE 6 shows the double-wrap friction band 100 as blanked from a flexible metal strip stock. This band has a central bridge 103 and spaced legs 105 and 107 which extend therefrom in one direction and an oppositely extending central leg 109. The outer edges of legs 105 and 107 are straight but have inner edges 111 which taper from the bridge portion in a manner so that the legs 105 and 107 become increasingly smaller as they extend away from the bridge portion. These two legs define an outwardly extending tapered slot 113 which gradually increases to conform with the dimensions of single leg 109. As shown, leg 109 is tapered outwardly from the bridge portion in a manner so that the width decreases as it extends from the bridge portion.

The legs 109, 105 and 107 are provided with lugs 117 and 119 which may be formed by an upsetting of the ends of the legs and machined as described in connection with the previous embodiment. The friction band is then cylindrically shaped into a hoop and stretched to give it a permanent set. After sizing, the side edges of leg 109 contact the respective inner edges 111 of legs 105 and 107; the outer periphery is then provided with a suitable friction liner 121 similar to the liner described above. The band may then be installed in an environment such as that illustrated in FIGURE 4.

As shown in this figure, there is a drum member 125 having an interior friction surface which is engaged by the friction liner 121 of the band. The drum, as in the previous embodiment, may be secured to the control gear of a power transmitting planetary gear set, not shown. The friction band is grounded to a transmission case or housing 127 by adjustment screws 129 which thread through an extended portion 128 of the case 127 into contact with the lugs 119. The lug 117 provided on the end of the leg 109 is connected by a pivoted lever 133 to an apply piston 135 similar to that of FIGURE 1. When the piston is retracted, the brake band will be in its relaxed position and the liner will be spaced from the interior of the drum.

This position, illustrated in FIGURE 5, shows the outer edges of the central leg 109 in contact with or closely adjacent to the inner edges 111 of the legs 105 and 107. This contact or close clearance when the band is in a free position will diminish or eliminate any tendency of the legs to vibrate and produce noise. The band can be expanded by energizing the piston so that apply movement of the piston pivots lever 133. The lever will then cause the band to expand. When expanded, the exterior friction face of the band will engage the interior of the drum and retard rotation thereof to condition the planetary gear unit for establishing a ratio. As the band is expanded for band apply, the clearance between the legs will increase.

From the above it will be understood that applicants have provided a resilient, one-piece, metallic friction band which may be used as a multiple-wrap, self-energizing brake band for an automatic transmission. The band may be readily made from strip stock with a blanking die which can simultaneously form the single leg on one part and two legs on the next part. With applicants' construction the band has a uniform width when hooped and there is a built-in clearance between the legs and no sawing or cutting of the legs is necessary. When the brake band is released, the legs will be closely adjacent or in contact with each other to minimize band rattle or vibration noises.

Although applicants have disclosed and described several embodiments of their invention it will be appreciated that other designs and configurations may be employed utilizing applicants' teachings which provide the same advantageous result.

Thus, for example, a blank having two spaced and suitably tapered legs extending in one direction and three spaced and suitably tapered legs extending in an opposite direction may be formed into a hoop with the two legs extending into respective spaces between the three legs in a manner similar to that of FIGURE 2 or FIGURE 5. It will therefore be understood that applicants' construction is not to be limited to the particular described embodiments but only by the claims which follow.

We claim:

1. A friction band movable from a set position to an apply position for retarding rotation of an element relative to said band comprising, first leg members having inner edges defining leg receiving slot means therebetween, additional leg means extending into said slot means, said additional leg means having outer edges which are adjacent to the inner edges of said leg members, said outer edges of said leg means and inner edges of said first leg members having minimum clearance therebetween when said band is in a set position and increased clearance therebetween when said band is moved toward an apply position.

2. The friction band of claim 1, said leg members having straight outer edges, and said band being an annular brake band of uniform width.

3. The friction band of claim 2 wherein said band is a resilient hooped member having a friction surface thereon, motor means for deforming said band and moving it to said apply position into frictional engagement with said element, said band exerting a force of recovery to return to said set position spaced from said element when released by said motor means.

4. The friction band of claim 1 wherein said leg means is provided by at least one tapered leg, said slot means being defined by facing inclined inner edges on said first leg members, said slot means being shaped to conform with the tapered shape of said leg.

5. The friction band of claim 4 wherein said device has an intermediate portion, said leg means having an increasing width as it extends from said intermediate portion and wherein said slot means has a decreasing width as it extends from said intermediate portion.

6. The friction band of claim 5 wherein said device is a multi-wrap friction band, said band being a contracting band engageable with an exterior friction surface of said element.

7. The friction band of claim 4 wherein said band has an intermediate portion, said leg having decreasing width as it extends from said intermediate portion, said slot means having increasing width as it extends from said intermediate portion.

8. The friction band of claim 7 wherein said band is an expandable band having an exterior friction surface which engages with an interior surface of said element when said band is expanded.

9. A flexible friction band for retarding rotation of a rotatable member, said band having a bridge portion and at least two spaced leg portions extending therefrom in one direction, said band having another leg portion which extends from said bridge portion in an opposite direction, said spaced leg portions having tapered inner edges which define a tapered slot therebetween, said oppositely extending leg portion having tapered edges, said last mentioned leg portion being similar to said slot, said band being annular in formation with the oppositely extending leg portion interfitting between said spaced leg portions, said leg portions having ends spaced from said bridge portion to provide travel clearance, said leg portions having minimum clearance therebetween when said band is in a set position and spaced from said rotatable member and maximum clearance when said band is moved into engagement with said member.

10. The flexible friction band of claim 9 wherein said band has a friction surface exteriorly of the band for contacting the rotatable member and retarding rotation thereof in response to band expansion.

11. The flexible friction band of claim 9 wherein said band has an interior friction surface for contacting and retarding rotation of the rotatable member in response to band contraction.

12. The flexible band of claim 9 wherein said spaced leg portions form a narrowing slot therebetween extending from said bridge portion.

13. The flexible band of claim 9 wherein said spaced leg portions form a slot which increases in width as it extends from said bridge portion.

14. The flexible band of claim 9 wherein each said leg portions have lug members on the ends thereof, apply means engageable with at least one of said lug members to move said band to an apply position, a stationary member, and means for connecting the other of said lug members to said stationary member to anchor one end of the band thereto.

References Cited
UNITED STATES PATENTS 2,657,767  11/1953  House.
2,857,162  10/1958  Zuercher.

FOREIGN PATENTS 166,902  1/1922  Great Britain.

DUANE A. REGER, *Primary Examiner.*

UNITED STATES PATENT OFFICE
CERTIFICATE OF CORRECTION

Patent No. 3,386,535                         June 4, 1968

Gary E. Bishop et al.

It is certified that error appears in the above identified patent and that said Letters Patent are hereby corrected as shown below:

Column 5, lines 9 and 14, "device", each occurrence, should read -- band --.

Signed and sealed this 14th day of October 1969.

(SEAL)
Attest:

Edward M. Fletcher, Jr.                     WILLIAM E. SCHUYLER, JR.
Attesting Officer                              Commissioner of Patents